(12) United States Patent
Jin et al.

(10) Patent No.: US 8,176,560 B2
(45) Date of Patent: May 8, 2012

(54) EVALUATION OF TAMPER RESISTANT SOFTWARE SYSTEM IMPLEMENTATIONS

(75) Inventors: Hongxia Jin, San Jose, CA (US); Ginger Marie Myles, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 709 days.

(21) Appl. No.: 12/152,486

(22) Filed: May 14, 2008

(65) Prior Publication Data

US 2009/0287679 A1    Nov. 19, 2009

(51) Int. Cl.
G06F 21/00    (2006.01)
(52) U.S. Cl. ......................................................... 726/25
(58) Field of Classification Search .................... 726/25
See application file for complete search history.

(56) References Cited

U.S. PATENT DOCUMENTS

| | | | |
|---|---|---|---|
| 6,535,227 B1 * | 3/2003 | Fox et al. ..................... | 715/736 |
| 6,983,371 B1 | 1/2006 | Hurtado et al. | |
| 7,130,615 B2 | 10/2006 | Montz et al. | |
| 7,277,870 B2 | 10/2007 | Mourad et al. | |
| 7,287,166 B1 | 10/2007 | Chang et al. | |
| 7,313,679 B2 | 12/2007 | Ranganathan | |
| 2005/0021989 A1 * | 1/2005 | Johnson et al. .............. | 713/194 |
| 2005/0138423 A1 | 6/2005 | Ranganathan | |
| 2005/0283834 A1 * | 12/2005 | Hall et al. ..................... | 726/24 |
| 2006/0149683 A1 | 7/2006 | Shimojima et al. | |
| 2008/0184041 A1 * | 7/2008 | Jakubowski et al. ......... | 713/194 |

* cited by examiner

*Primary Examiner* — Benjamin Lanier
*Assistant Examiner* — Cordelia Zecher
(74) *Attorney, Agent, or Firm* — Cantor Colburn LLP; Mohammed Kashef

(57) ABSTRACT

According to one embodiment of the present invention, a method for evaluating a software system includes defining a rating of the tamper resistance of a software system and breaking down the rating into a plurality of metrics relevant to the tamper resistance of the software system. A score may then be calculated for each metric and the scores may be combined into a composite score for the rating.

25 Claims, 15 Drawing Sheets

```
void main(int argc, char *argv[]){
    int x = atoi(argv[1]);
    printf("%d! = %d\n", x, factorial(x));
} int factorial(int x){
    if(x == 1)
        return x;
    return(x * factorial(x-1));
}
```

FIG. 1

```
long key = seed;

void main(int argc, char *argv[]){
    int x = branchFunction1(argv[1]);
    branchFunction2("%d! = %d\n", x, branchFunction3(x));
} int factorial(int x){
    if(x == 1)
        return x;
    return(x * factorial(x-1));
} void branchFunction1(void *x){
    //perform anti-debugging check
    //evolve the key
    //compute return address
    return;
} void branchFunction2(void *x){
    //compute checksum over main and factorial
    //evolve the key
    //compute return address
    return;
} void branchFunction3(void *x){
    //compute checksum over factorial
    //evolve the key
    //compute return address
    return;
}
```
Resistance

FIG. 2

```
void main(int argc, char *argv[]){
    int x = atoi(argv[1]);
    printf("%d! = %d\n", x, factorial(x));
} int factorial(int x){
    if(x == 1)
        return x;
    return(x * factorial(x-1));
}
```

FIG. 12

```
long key = seed;

void main(int argc, char *argv[]){
    int x = branchFunction1(argv[1]);
    branchFunction2("%d! = %d\n", x, branchFunction3(x));
} int factorial(int x){
    if(x == 1)
        return x;
    return(x * factorial(x-1));
} void branchFunction1(void *x){
    //perform anti-debugging check
    //evolve the key
    //compute return address
    return;
} void branchFunction2(void *x){
    //compute checksum over main and factorial
    //evolve the key
    //compute return address
    return;
} void branchFunction3(void *x){
    //compute checksum over factorial
    //evolve the key
    //compute return address
    return;
}
```

FIG. 14

EVALUATION OF TAMPER RESISTANT SOFTWARE SYSTEM IMPLEMENTATIONS

BACKGROUND

The present invention relates to tamper resistant software system implementations, and more specifically, to the evaluation of the strength of tamper resistant software system implementations.

It is frequently desirable to provide software that is protected against tampering. Military software, music and move software, video games and software with embedded licenses are examples of software for which tamper resistance is frequently provided. As the music and movie industries begin to make digital content more widely available, they rely more heavily on tamper resistant software, which raises the importance in the effectiveness of these techniques.

As the value of software at risk of piracy increases, many new techniques for tamper resistant software have been introduced. With many different techniques available it would be desirable to have a way to evaluate the strength of these techniques based on the tamper-resistance of particular software implementations. However, a satisfactory strength evaluation scheme has not been available. As a result, it is difficult to make comparisons between multiple proposed tamper-resistance techniques.

One reason for a lack of evaluation tools is that many tamper resistance technologies rely on trade secrets. A detailed public evaluation of such secrets could decrease the strength of the technique by revealing important aspects of the technique to individuals intent on its circumvention.

Another reason for the lack of adequate software tamper resistance evaluation tools is that the strength of such a system is tightly linked to the particular implementation and the software which it is protecting. As a result, an evaluation of the strength of a technique for one implementation on a particular kind of software may be invalid for an implementation of the technique on different software.

Another impediment to evaluation of the effectiveness of tamper resistant software is that developing a team of knowledgeable personnel in-house with the skills to properly evaluate the software is cost prohibitive. Furthermore, many of these software developers are reluctant to release their software to outside evaluation out of fear of leaking their intellectual property.

SUMMARY

According to one embodiment of the present invention, a method comprises: defining a rating of the tamper resistance of a software system; decomposing the rating into a plurality of metrics relevant to the tamper resistance of the software system; calculating a score for each metric; and combining the scores of the metrics into a composite score for the rating.

According to another embodiment of the present invention, a method comprises: defining a rating and a plurality of sub-ratings of the tamper resistance of a software system; breaking down the plurality of sub-ratings into a plurality of metrics relevant to the tamper resistance of the software system; calculating a score for each metric; combining the scores of the metrics into composite scores for the sub-ratings; and combining the composite scores for the sub-ratings into an overall score for the rating of the software system.

According to a further embodiment of the present invention, a method comprises: defining a rating of the tamper resistance of at least two software systems; decomposing the rating into at least one sub-rating that is a subset of the rating; breaking down the sub-rating into a plurality of metrics relevant to the tamper resistance of the at least two software systems; calculating a score for each metric; combining the scores of the metrics into a composite score for the sub-rating and combining the scores of the sub-ratings into a composite score for the rating for each of the at least two software systems; and comparing the ratings of different ones of the at least two software systems to determine which software system has the highest tamper resistance.

According to an additional embodiment of the present invention, a service of providing a rating of a software system comprises: receiving a software system from an entity; defining a rating of the tamper resistance of the software system; decomposing the rating into at least one sub-rating that is a subset of the rating; breaking down the sub-rating into a plurality of metrics relevant to the tamper resistance of the software system; calculating a score for each metric; combining the scores of the metrics into a composite score for the sub-rating and combining the scores of the sub-ratings into a composite score for the rating; and providing a security rating for the software system to the entity.

According to another embodiment of the present invention, a computer program product for rating the tamper resistance of a software system, the computer program product comprises: a computer usable medium having computer usable program code embodied therewith, the computer usable program code comprising: computer usable program code configured to: define a rating of the tamper resistance of a software system; decompose the rating into at least one sub-rating that is a subset of the rating; break down the sub-rating into a plurality of metrics relevant to the tamper resistance of the software system; calculate a score for each metric; and combine the scores of the metrics into a composite score for the rating.

BRIEF DESCRIPTION OF THE SEVERAL VIEWS OF THE DRAWINGS

FIG. 1 is a diagram of a simple redundance-based TRS system;

FIG. 2 is a diagram of a simple hierarchy based TRS system;

FIG. 12 is a function-instance graph for the factorial program shown in FIG. 7.

FIG. 14 is a call graph;

DETAILED DESCRIPTION

Figure 3:
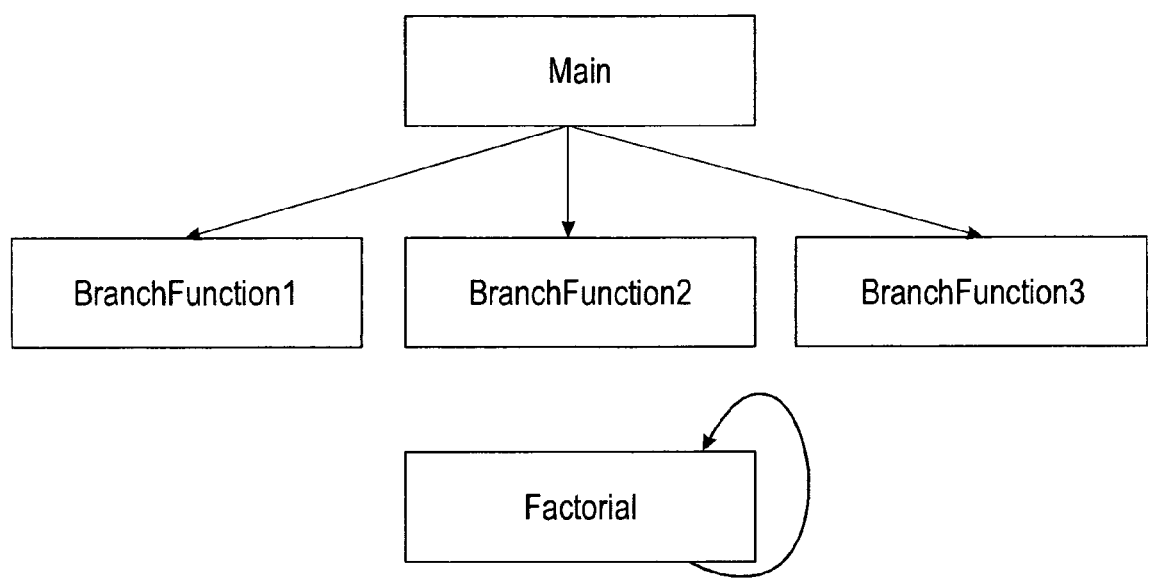
FIG. 3 diagram of a trivial cluster based TRS system.

Embodiments of the invention provide a self-evaluation tool which guides a software developer through the evaluation process and produces an overall evaluation score. This evaluation score can be publicly shared without leaking confidential implementation details. In particular, using the present invention, tamper resistant software (TRS) developers can quantitatively evaluate the strength of a particular implementation of their protection system through the use of one or more numeric ratings. These ratings can be very specific and target a particular aspect of the system, or they can be general and focus on the system as a whole. For example, the developer may wish to measure how much of the program is covered by the protection mechanism(s) through the use of a Protection Coverage rating or he may be interested in evaluating the overall strength of the system.

For a particular rating, embodiments of the invention include the following three steps:

1) Break the desired rating down into a set of metrics that are relevant to the specific measurement;
2) For each metric, calculate a score; and
3) Combine the scores of each metric into an overall score for the rating.

In some embodiments in step 1 the rating may be a more general rating which is then broken down into sub-ratings which are further broken down into sets of metrics. For example, if we are measuring the overall strength of the TRS system, then we may break that rating into the protection coverage sub-rating, the system complexity sub-rating, etc. A score for each of the sub-ratings is calculated according to steps 1-3 and then they are combined to produce the general rating.

In order to calculate a score for each metric in step 2 an appropriate model of the protection system may be constructed. One example of such a model is a graphical representation of the relationship between functions. These results are then combined in step 3 to derive a composite score from the calculated score for each metric.

One advantage of the invention is that it provides a quantitative evaluation of the capabilities of a TRS system. Additionally, the invention has the advantage of producing an overall evaluation score that can be shared without leaking confidential information. One way to use the invention is to provide an objective way to compare the strength of multiple TRS systems. Also, the production of an overall evaluation score may be particularly useful in licensing-based content protection systems, where a licensee is required to meet certain implementation robustness requirements. For example, the ratings, their respective metrics and the modeling method can be provided in a self-certification tool by the licensing agency based on expert knowledge. Then, each licensee only needs to provide the agency with a score and doesn't need to reveal any confidential implementation details. Prior systems did not provide a quantitative evaluation of the tamper resistance of software systems without revealing confidential information.

TRS system implementations are very diverse. However, in many instances, a common set of questions are being addressed. Embodiments of the invention use these questions to guide the evaluation process. Each question may become one of the metrics used in step 1 above and a subset of the questions may form a rating or a sub-rating. Each question may be phrased such that for the ideal TRS system the answer would be "yes". In addition to the "yes" or "no" answer, a quantitative value for each question may be calculated. This value is the metric score used in step 2 above.

The following example will illustrate how these three steps can be used to quantitatively evaluate a TRS system. Suppose we want to evaluate the overall tamper resistance strength of a particular TRS system implementation. A rating will be defined called an Overall System Protection (OSP) Rating.

In step 1 the OSP Rating is broken down into a set of sub-ratings, based on some evaluation driven questions. In this embodiment, the general questions we are interested in when it comes to an overall evaluation are:

1) Is the entire software system protected? (Protection Coverage Rating);
2) Is it hard to understand and disable the embedded protection mechanism(s)? (System Complexity Rating); and
3) Are additional protection efforts being made to aid the embedded protection mechanism(s)? (Auxiliary Protection Rating)

These questions correspond to the following three sub-ratings.

1. Protection Coverage Rating—Indicates how much of the program is covered by the protection mechanism(s). This rating is useful because there are situations where a system may have a very high complexity rating, but very little coverage of the program, or the coverage may miss key functionality.

2. Complexity Rating—Indicates how difficult it is to understand and disable the protection mechanism(s).

3. Auxiliary Protection Rating—Indicates the degree to which additional measures have been taken to complicate an understanding of the program and/or its protection mechanisms.

In step 2 of the OSP rating, each of the above questions can be answered and a score for each sub-rating can be calculated by recursively following the above-described steps 1-3. For example, we will discuss the Protection Coverage (PC), which is used to evaluate how much of the program is covered by the protection mechanisms. In PC rating Step 1 we break the PC Rating down into a set of metrics based on a set of evaluation driven questions. In an embodiment described in detail below, six such questions will be used. Each of these questions becomes a metric in the protection coverage rating. In PC rating Step 2, each of the PC questions is answered and a score is calculated. In PC rating step 3, we combine the metric scores to derive a PC rating.

We repeat these steps for the System Complexity and Auxiliary Protection Ratings. Additional details of the System Complexity and Auxiliary Protection ratings are discussed below.

Knowing the score for each sub-rating, finally, in OSP Step 3 we combine the sub-rating scores to derive the overall score. We combine the ratings by multiplying each component by a constant representing that rating's importance and adding/multiplying the values together. The sum of the constants is 1. Hence, Overall System Protection Rating (OSPR)=(a)PCR+/*(b)SCR+/*(c)APR where a+b+c=1. A simple way is to choose the constants would be a=b=c=⅓. Whether addition or multiplication is used depends on the purpose of the OPS evaluation. If the purpose is to calculate the probability of subversion, multiplication is used; if, on the other hand, the purpose is to calculate the cost of subversion, addition is used. Each of the above three ratings is described in more detail below.

Protection Coverage Rating

There are a variety of questions the protection coverage model should be able to answer and that the rating should reflect. In this embodiment these questions may include:
1. Is essential functionality/data covered?
2. Do anti-debugging checks occur throughout the entire execution of the program?
3. Is each integrity verification method invoked at multiple places throughout the program?
4. Is there cross-checking of integrity verification methods? i.e. Are the integrity verification methods themselves protected?
5. Are the protection methods overlapping?
6. Are there multiple methods of protecting the integrity of the program?

For the ideal TRS system each one of these questions would have the answer "yes". In this embodiment, an evaluation tool is described that will output the value "yes" or "no" for each of the above questions. This evaluation tool may also output an individual rating for each question and an overall protection coverage rating, which is a combination of the individual ratings.

In order to calculate a protection coverage rating we need a method of modeling the protection capabilities of the TRS system. To do this we will first construct the call graph for the program. If there are any aspects of the program which are not functions but that require protection, such as a memory segment, we add a block to the graph. We then add a directed edge between two blocks A and B when A provides protection for B. To represent something like obfuscation or encryption we insert a place holder block, so if multiple obfuscation techniques were used we would insert multiple place holder blocks. Finally, we mark any essential blocks of code. This graph becomes the protection coverage graph. We also use the call graph to construct the function-instance graph. The call graph can be transformed into a tree of function instances by a depth-first traversal of the call graph.

Using the protection coverage model we are able to develop individual ratings for each of six protection coverage questions listed above. It may be noted that the protection coverage rating does not (and preferably should not) say anything about the quality of the protection or how easily it can be subverted. We use the following notation in the ratings:
B—the set of all blocks.
$B_e$—the set of essential blocks.
$B_{ep}$—the set of essential blocks which are protected.
$E_c$—the set of call edges in the graph.
$E_p$—the set of protection edges in the graph.
$B_p$—the set of all protection blocks ($B_p=B_{iv}+B_{pp}$).
$B_{iv}$—the set of integrity verification protection blocks.
$B_{ad}$—the set of anti-debug protection blocks.
$B_{pp}$—the set of place holder protection blocks.
$B_f$—the set of blocks which are not protection blocks.
$in_c(b)$—the incoming call edges for block b.
$in_c(b)$—the incoming protection edges for block b.
L—the set of levels in the function-instance graph.
$out_c(l)$—the out going call edges for the block(s) on level l.
$out_{cp}(l)$—the out going call edges for the block(s) on level l whose sink is a protection block.

1. Is essential functionality/data covered? (Essential Coverage Rating—ECR)

$$ECR = \frac{|B_{ep}|}{|B_e|}$$

2. Do anti-debugging checks occur throughout the entire execution of the program? (Anti-Debugging Rating—ADR)

$$ADR = \frac{\sum_{l \in L} \frac{|out_{cp}(l)|}{|out_c(l)|}}{|L|}$$

3. Is each integrity verification method invoked at multiple places throughout the program?(Multiple Invocation Rating—MIR)

$$MIR = \frac{\sum_{b \in B_{iv}} \frac{|in_c(b)|}{|E_c|}}{|B_{iv}|}$$

4. Is there cross-checking of integrity verification methods, i.e. are the integrity verification methods themselves protected? (Cross-Check Rating—CCR)

$$CCR = \frac{\sum_{b \in B_{iv}} \frac{|in_p(b)|}{|E_p|}}{|B_{iv}|}$$

5. Are the protection methods overlapping? (Protection Overlap Rating—POR)

$$POR = \frac{\sum_{b \in B_f} \frac{|in_p(b)|}{|E_p|}}{|B_f|}$$

6. Are there multiple methods of protecting the integrity of the program? (Multiple Protection Rating—MPR)

$$MPR = \frac{|B_p|}{|B|}$$

To construct the overall protection coverage rating (PCR), the individual ratings may be combined by multiplying each component by a constant representing that ratings importance and adding the values together. The sum of the constants is 1.
PCR=(a)ECR+(b)ADR+(c)MIR+(d)CCR+(e)POR+(f)MPR
where a+ . . . +f=1

Two examples will illustrate how the protection coverage modeling may be applied to derive a protection coverage rating. Each of these examples is based on the simple factorial program shown in FIG. 1. The first example is the Branch-Based tamper resistance technique, which converts branch instructions to calls to a branch function. The branch function then performs an integrity check of the program and calculates the proper branch target instruction. FIG. 2 illustrates what the factorial program could look like after the Branch-Based tamper resistance protection has been applied.

Figure 4:
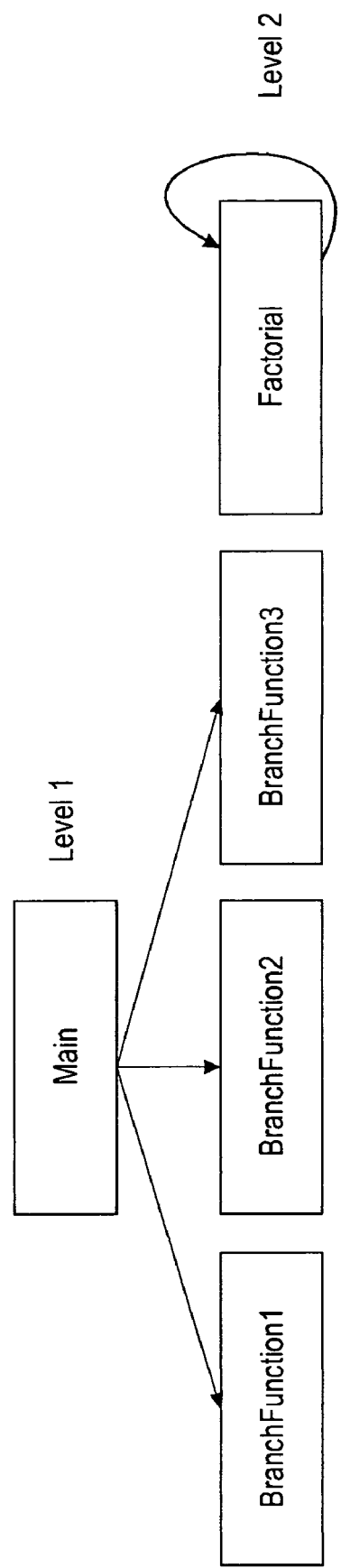
FIG. 4 is a simple factorial program.
Figure 5:
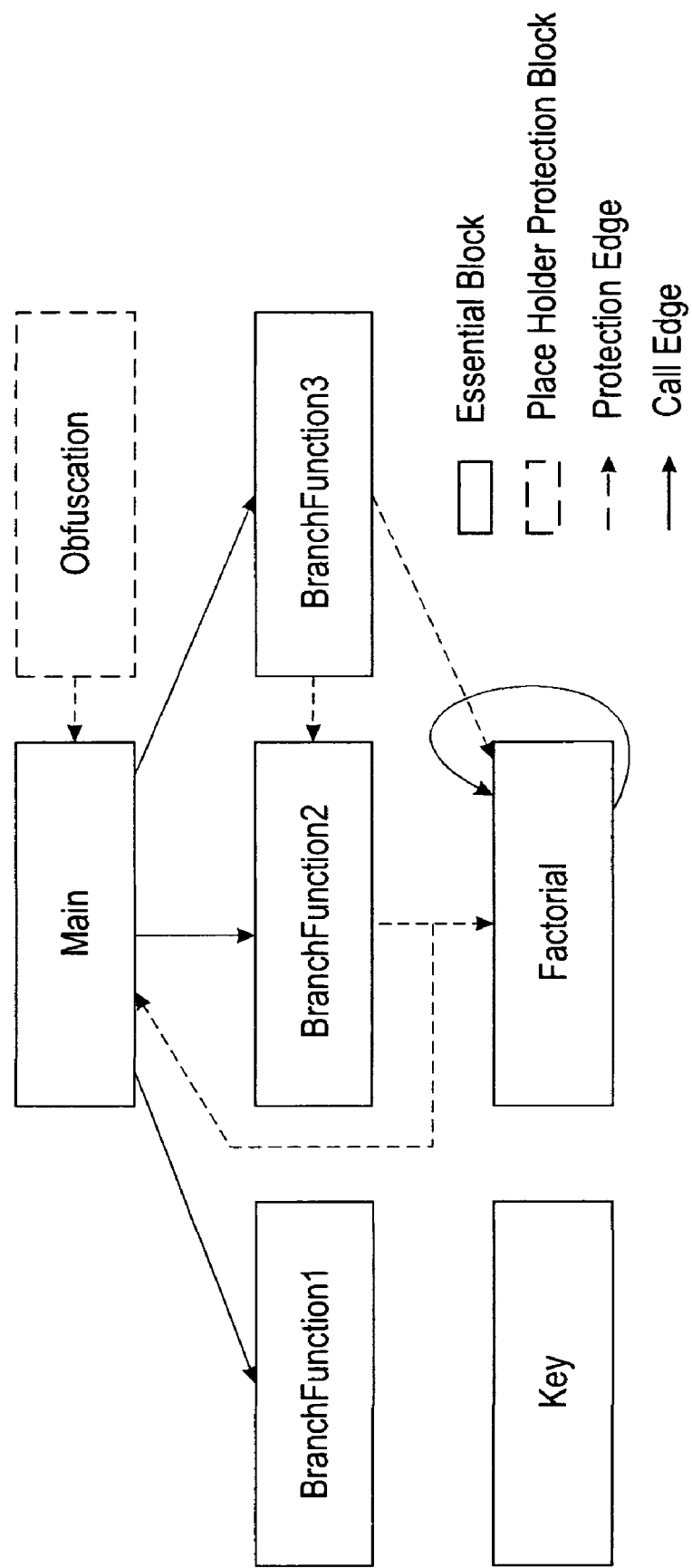
FIG. 5 is a graphical model used to calculate complexity rating in accordance with an embodiment of the invention.

In order to calculate the individual protection coverage ratings we construct three graphs: the call graph shown in FIG. 3, the function-instance graph shown in FIG. 4, and the protection coverage graph shown in FIG. 5.

If we apply the ratings to our example we get:
ECR=2/3=0.67

$$ADR = \frac{\frac{1}{3}+\frac{0}{1}}{2} = 1/6 = .17$$

$$MIR = \frac{\frac{1}{4}+\frac{1}{4}+\frac{1}{4}}{2}$$

CCR=0

$$POR = \frac{\frac{2}{4}+\frac{2}{4}+\frac{0}{4}}{3} = 1/3 = .33$$

MPR=4/7=0.57
By splitting the constants evenly we arrive at an overall protection rating of:
PCR=(0.167)(0.667)+(0.167)(0.167)+(0.167)(0.25)+(0.167)(0)+(0.167)(0.33)+(0.167)(0.57)=0.111+0.028+0.04+0+0.055+0.095=0.329

Figure 6:
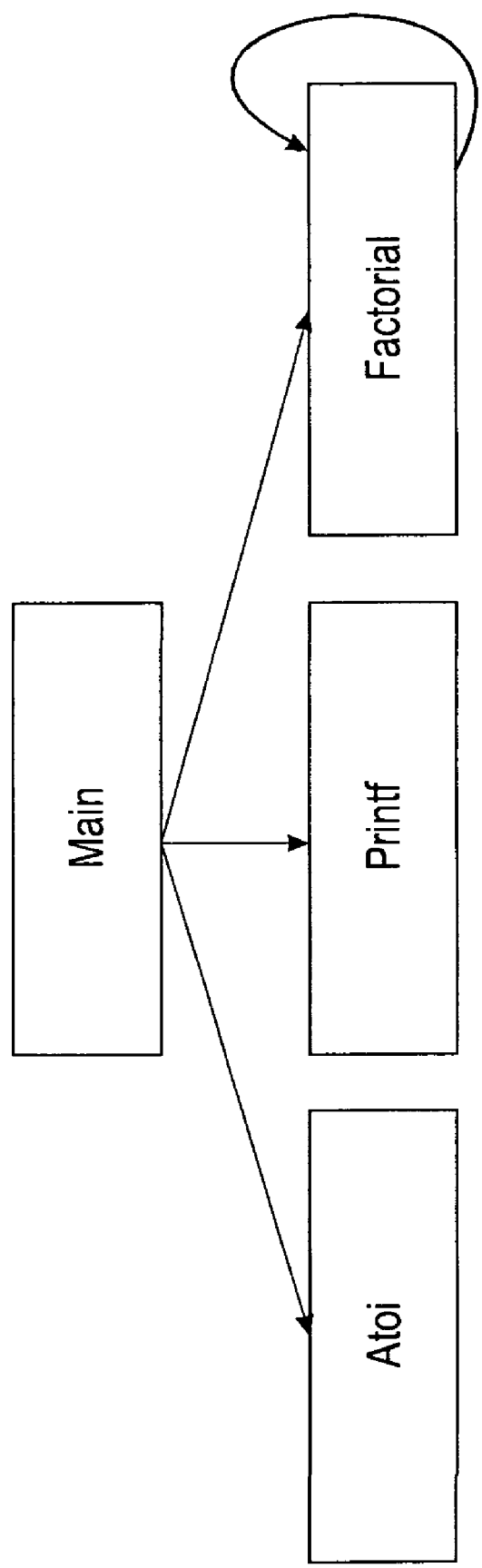
FIG. 6 is a simple factorial program.
Figure 7:
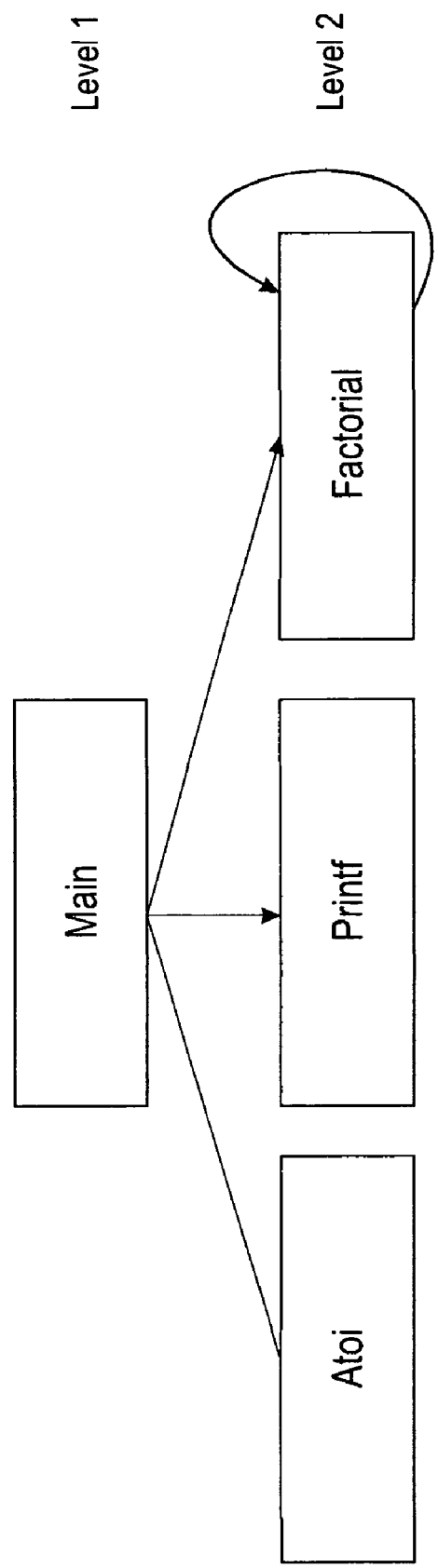
FIG. 7 is a simple factorial program.
Figure 8:
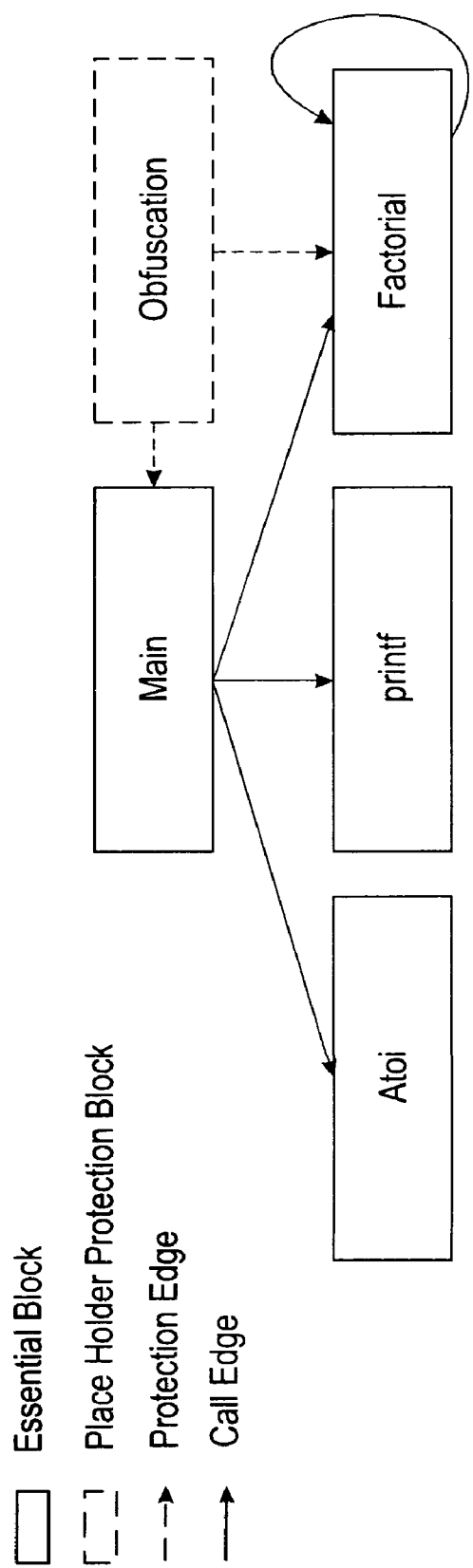
FIG. 8 is a call graph for the factorial program shown in FIG. 7.

The second example will apply only a single obfuscation to the functions main and factorial. The particular obfuscation being using is not important when modeling for the protection coverage. The call, function-instance, and protection coverage graphs are illustrated in FIGS. 6, 7, and 8 respectively.

Using these graphs we obtain the following ratings:
ECR=2/2=1
ADR=0
MIR=0
CCR=0

$$POR = \frac{\frac{1}{2}+\frac{1}{2}}{4} = 1/4 = .25$$

MPR=1/5=0.2
By splitting the constants evenly we arrive at an overall protection rating of:
PCR=(0.167)(1)+(0.167)(0)+(0.167)(0)+(0.167)(0)+(0.167)(0.25)+(0.167)(0.2)+(0.167)(0)=0.167+0+0+0+0.042+0.033=0.242

Complexity Rating

In evaluating the complexity of a TRS system it is desirable to consider the topological configuration of the system and the strength of the atomic protection units. When evaluating the atomic protection units there are three types to consider: detection, response, and concealment. There are also a variety of questions the complexity model should be able to answer and that the rating should reflect. In this embodiment, these questions include:

General questions:
  1. Is it impossible to disable the protection in stages?
Tamper Detection specific questions:
  1. Is the detection code stealthy?
  2. Is detection widely separated in space from response?
  3. Is detection widely separated in time from a response which induces program failure?
Tamper Response specific questions:
  1. Is the response code stealthy?
  2. Does a program that has been tampered with eventually fail or repair itself?
  3. Does a program that has been tampered with initially proceed seemingly normally so as to hide the location of the response mechanism?
Concealment specific questions:
  1. Can the protection thwart static disassembly of the operational code and its basic structure?
  2. Are any decryption keys obfuscated?

For the ideal TRS system each one of these questions would have the answer "yes" or "N/A". In this embodiment, the evaluation tool will output the value "yes", "no", or "N/A" for each of the above questions. It will also output an individual rating for each question and an overall complexity rating which is a combination of the individual ratings.

Part of being able to properly evaluate a tamper resistance mechanism is being able to properly model its behavior. One possible modeling approach is to transform the tamper resistance capabilities into a graph. In one embodiment, this may be accomplished as follows:

1. Each code block in the program becomes a node in our graph. A code block can have any level of granularity and the particular composition of a code block will depend of the tamper resistance algorithm.
2. If a code block $c_i$ provides integrity verification for another code block $c_j$, a directed edge is added from $c_i$ to $c_j$.
3. If a code block $c_i$ triggers the anti-debugging protection provided by code block $c_j$, a directed edged is added from $c_j$ to $c_i$.
4. If a code block $c_i$ repairs another code block $c_j$, a directed edge is added from $c_i$ to $c_j$.
5. If a code block $c_i$ contains concealment protection a new block is added to the graph and a directed edged from the new block to $c_i$ is added.
6. If a code block $c_i$ provides protection for more than one block a super block is added encompassing the protected blocks. A directed edge is added from $c_i$ to the super block.

Using the graph topology model enables us to analyze and evaluate the way tamper resistance is incorporated into existing software. Additionally, the graph model provides a common base for comparing tamper resistance algorithms. Using the graph model we are able to evaluate different aspects of the TRS system. For example, 1. We can evaluate the size overhead by looking at which code blocks are added or altered as a result of adding the tamper resistance. For each block we can associate an overhead value. Those blocks which are original and unaltered will have an overhead value of zero.
2. We can evaluate the time overhead by associating with each edge the time required to perform the associated action.
3. We are able to break the TRS system down to its atomic protection units. By atomic protection units, we mean they do not have to be broken further down and go through step 1-3 in order to calculate their score; instead we know how to directly associate a score indicating how difficult it would be to defeat that particular unit. Based on the topology of the graph we can combine the unit complexity ratings to determine the overall complexity rating for the TRS system.

In discussing the complexity model the following defined terms will be used:

Degree of Incidence—This is the indegree of any particular node in the graph. It measures the number of tamper detection code segments monitoring a particular code segment.
Per-stage Complexity Rating—The complexity rating associated with disabling a subset of the tamper detection components without triggering any detection mechanism.
Maximum Per-stage Complexity Rating—The maximum of the per-stage complexity ratings. This quantifies the maximum resistance the framework can put up at any given time.

Total Complexity Rating—The complexity rating associated with disabling the entire TRS system.

There are a variety of different topological arrangements which can be used in designing the TRS system. In this section we describe three hypothetical configurations.

Figure 9:
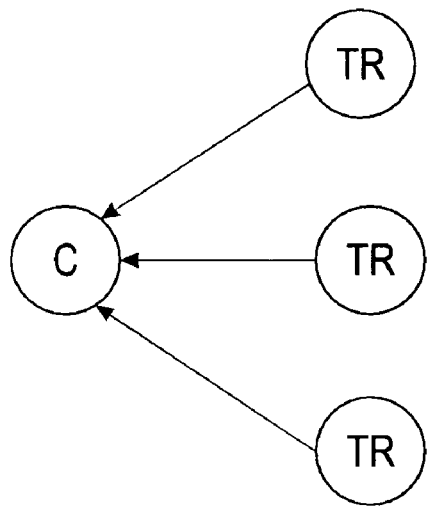
FIG. 9 is a function-instance graph for the factorial program shown in FIG. 7.

The first configuration is redundancy. In the redundancy configuration, tamper resistance mechanisms are incorporated throughout the program without dependencies between the different mechanisms. FIG. 9 illustrates a possible configuration using redundancy. In this case the TRS system can be subverted in stages. If one of the tamper resistance units is disabled it will not be detected by any of the others.

Figure 10:
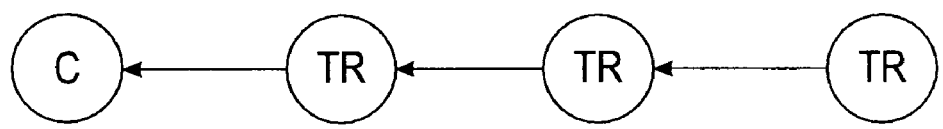
FIG. 10 is a protection coverage graph for the factorial program shown in FIG. 7.
Figure 11:
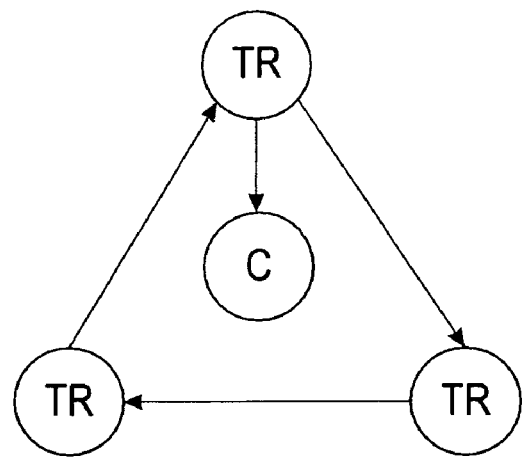
FIG. 11 is a call graph for the factorial program shown in FIG. 7.

The second configuration is hierarchy. The hierarchy configuration consists of n layered tamper resistance mechanisms. Each layer provides tamper resistance protection for the mechanism in the lower layer. The innermost layer protects the code block. FIG. 10 illustrates this configuration. As with the redundancy configuration, a TRS system configured as a hierarchy can be subverted in stages by starting with the outermost tamper resistance mechanism. Theoretically this configuration is marginally stronger than the redundancy configuration since an attacker has to identify the outer-most layer.

The third configuration is cluster. In the cluster configuration the tamper resistance mechanisms are arranged in a strongly connected digraph topology with some degree of incidence d. The degree of incidence for the cluster is the minimum degree of incidence within the cluster. Theoretically, the cluster configuration provides the highest level of protection. In this configuration, subverting any of the tamper resistance mechanisms within the cluster requires subverting all of the mechanisms in the cluster simultaneously. FIG. 14 illustrates a trivial cluster-based TRS system which has a degree of incidence d=1.

In the cluster configuration, in order to disable the entire cluster each tamper resistance mechanism along with its parent(s) must be subverted prior to the parent tamper resistance mechanism detecting an incidence of tampering. For single threaded programs, it may still be able to identify a sequence in which a cluster with a degree of incidence d=1 can be subverted. However, identifying this order is more difficult than in the hierarchy configuration. For programs in which code blocks can be executed in parallel, identifying the necessary sequence is even more challenging. Furthermore, as the degree of incidence increases, disabling a single tamper resistance mechanism will be detected by several other mechanisms, with the result being an increase in the number of mechanisms that must be subverted simultaneously.

An overall complexity rating for the TRS system may be developed using the complexity model and the complexity ratings of the atomic tamper resistant protection mechanisms. Calculating the complexity rating of an atomic protection mechanism is first based on the type of the protection mechanism. The three that we focus on are tamper detection mechanisms, tamper response mechanisms, and concealment mechanisms. The calculation is then guided by the questions specific to the protection mechanism. The calculated complexity rating is then plugged into the graphical model.

The first type of protection mechanism, the tamper detection complexity mechanism, will be rated as follows. A tamper detection mechanism is any section of code which was designed to detect some type of tampering. This could be a change in the actual instruction sequence or a change in the execution environment such as the use of a debugger. Below are some questions that may be considered when calculating the complexity rating of a tamper detection mechanism in this embodiment. Different sets of questions are also possible, since this is not an exhaustive list of things consider in the complexity rating.

Is the detection code stealthy? Ideally the detection code would be similar to the code around it. One possible way to measure this is to consider the instruction sequences in the original program, the tamper detection mechanism, and the tamper resistant version of the program.

$$\begin{cases} 1, & \text{if } \frac{|\text{instruction sequences that occur in } DM \text{ but not in } P|}{|\text{instruction sequences that occur in } P_{TRS}|} < \delta \\ 0, & \text{otherwise} \end{cases}$$

Is detection widely separated from response in space? One way to measure this is to count the number of instructions between the detection and response mechanisms.

$$\begin{cases} 1, & \text{if } |\text{instructions between detection and response}| > \delta \\ 0, & \text{otherwise} \end{cases}$$

Is detection separated in time from a response which induces program failure? There are a couple different ways this could be measured. One way would be to measure the number of seconds between detection and response.

$$\begin{cases} 1, & \text{if } |\text{seconds between detection and response}| > \delta \\ 0, & \text{otherwise} \end{cases}$$

Another way would be to use a call graph to model the time between detection and response.

$$\begin{cases} 1, & \text{if } |\text{function calls between detection and response}| > \delta \\ 0, & \text{otherwise} \end{cases}$$

The second type of protection mechanism is the tamper response mechanism, which is any section of code that has been designed to respond to an attack on the program. The response could be triggered by a change in the instruction sequence or the detection that the program is being run in a debugger. The response action taken can also vary. The mechanism could alter some portion of the program which eventually leads to program failure or it could repair a section of code which has been altered. Below are some questions that should be considered when calculating the complexity rating of a response mechanism. As with the tamper detection complexity, this is not an exhaustive list.

Is the response code stealthy? Ideally the response code is similar to the code around it. Response code will often rely on self-modifying code to either cause program failure or to repair a section of code. This type of code is not routinely used in common programs, so it is crucial this code is not easily detected by the attacker.

$$\begin{cases} 1, & \text{if } \frac{|\text{instruction sequences that occur in } RM \text{ but not in } P|}{|\text{instruction sequences that occur in } P_{TRS}|} < \delta \\ 0, & \text{otherwise} \end{cases}$$

Does a program that has been tampered with eventually fail or repair itself?

Does a program that has been tampered with initially proceed seemingly normally so as to hide the location of the response mechanism?

The third type of protection mechanism is the concealment complexity. A concealment mechanism is any protection technique which is used to disguise the true purpose of a section of code. This could come in the form of code obfuscation or even encryption. Questions related to the concealment complexity rating include:

Is the concealment code stealthy? Ideally even if a technique like obfuscation is used, the obfuscated code should still blend in with the code around it. This will avoid alerting the attacker to the fact that obfuscation is used because it indicates that the section of code is important.

$$\begin{cases} 1, & \text{if } \frac{|\text{instruction sequences that occur in } CM \text{ but not in } P|}{|\text{instruction sequences that occur in } P_{TRS}|} < \delta \\ 0, & \text{otherwise} \end{cases}$$

Can the protection thwart static disassembly of the operational code and its basic structure?

If encryption is used, are any decryption keys hidden?

In other embodiments, concealment complexity may be calculated using software complexity metrics.

The redundancy model will now be addressed. In the ideal situation, the total complexity rating for a redundancy based TRS system would be the sum of the complexity ratings for the atomic tamper resistant protection mechanisms, $$\sum_{i=1}^{n} CR(TR_i).$$

However, there is at least one factor which can decrease the overall effectiveness of a TRS system. This factor relates to the similarity of the tamper resistance mechanisms used. In the general sense we have three categories of tamper resistance mechanisms to consider: duplicated, derived, and unique.

In the duplicated scenario, one tamper resistance mechanism is used in multiple places to provide protection. While this does make it possible to protect different parts of the program, the extra work required to disable more than one of these mechanisms is negligible. This leads to the per-stage and total complexity ratings being equal:

per-stage CR=total CR=CR(TR).

A derived classification occurs when one or more tamper resistance mechanisms is a derivative of another mechanism in the TRS system. Because the mechanisms are similar, information learned from attacking one can be used to defeat the others. This has the effect of increasing the total complexity rating over the replicated scenario, but the complexity level is still sub-optimal for the given configuration.

per-stage CR=max{$CR(TR_i)|i \in n$}

$$\text{total } CR = \max\{CR(TR_i) \mid i \in n\} + \sum_{(j=1)\setminus i}^{n} CR(TR_j)[1 - sim(TR_i, TR_j)],$$

where $sim(TR_i, TR_j) \le 1$

The maximum complexity is achieved when the tamper resistance mechanisms are classified as unique. In this case, each of the mechanisms is unique and defeating one does not aid an attacker in defeating any of the others. In this case, we achieve the following complexity ratings:

per-stage CR=max{$CR(TR_i)|i \in n$}

$$\text{total } CR = \sum_{(i=1)}^{n} CR(TR_i)$$

It may be noted that the TRS system could be comprised of a mixture of these three categories.

The hierarchy model is described below. The hierarchy configuration can also be classified by duplicated, derived, and unique tamper resistance mechanisms. Using these categories we obtain the following complexity ratings:

Duplicated per-stage CR=CR(TR)+(cost to find outermost)

total CR=CR(TR)+(cost to order units)

Derived per-stage CR=CR(outermost TR)+(cost to find outermost)

$$-\text{total } CR = CR(\text{outermost } TR) + \sum_{(j=2)}^{n} CR(TR_j)[1 - sim(TR_i, TR_j)] + \text{cost to order units}$$

Unique per-stage CR=CR(outermost TR)+(cost to find outermost)

$$\text{total } CR = \sum_{(i=1)}^{n} CR(TR_i) + (\text{cost to order units})$$

In developing the cluster model it is noted that the cluster configuration can also be classified by duplicated, derived, and unique tamper resistance mechanisms. Using these classifications we have the following complexity ratings for the cluster model:

Duplicated per-stage CR=total CR=(2-1/d)(CR(TR))+(cost to identify all units in cluster), where d=degree of incidence for the cluster Derived per-stage $CR$ = total $CR$ $$= (2 - 1/d) \max \left[ \begin{Bmatrix} CR(TR_i) | i \in n \} + \\ \sum_{(j=1)\setminus i}^{n} CR(TR_j) \\ (1 - sim(Tr_i, TR_j)) \end{Bmatrix} \right] +$$

(cost to identify all units in cluster)

Unique per-stage $CR$ = total $CR$ $$= (2 - 1/d) \left[ \sum_{i=1}^{n} CR(TR_i) \right] +$$

(cost to identify all units in cluster)

Two examples of how the complexity rating modeling can be used to derive a complexity rating will now be shown. These are the obfuscation only example and the Branch-based tamper resistance example. Each of these examples will be based on the simple factorial program in FIG. 12.

Figure 13:
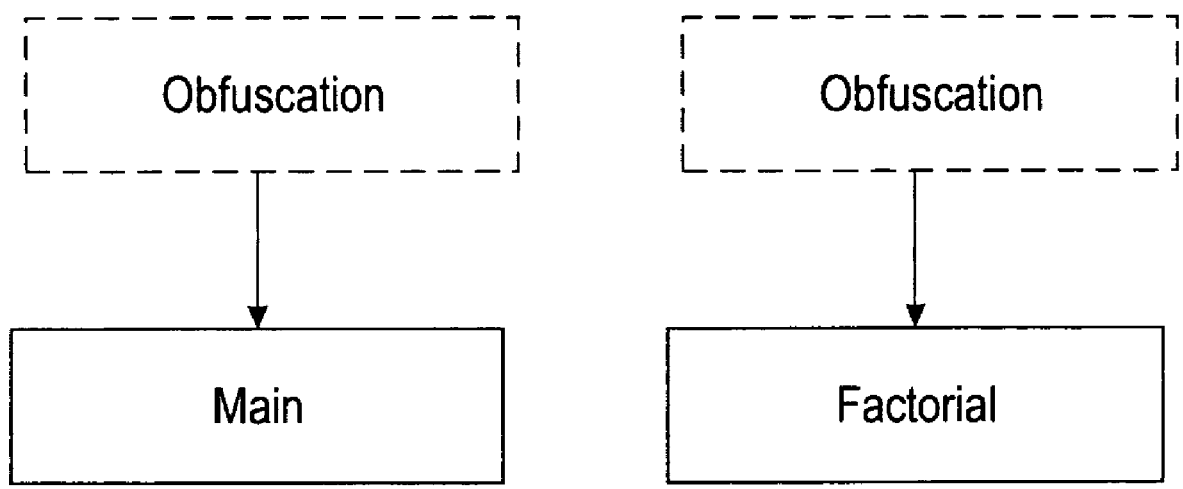
FIG. 13 is a protection coverage graph.

In the obfuscation only example we are applying a single obfuscation to the functions main and factorial. The particular obfuscation being used in not important in constructing the graphical model, however, if we wanted to calculate a numerical value for the complexity rating it would be important. The complexity model is illustrated in FIG. 13. In this figure we added two new blocks for the obfuscation. This is because, unlike an integrity check which is applied to two code blocks at the same time, the obfuscation is applied separately to the two different functions.

FIG. 13 also shows that we have a duplicated redundancy topological configuration. This leads to the following total CR:

total CR=CR(obf)

In the branch-based tamper resistance example it is noted that this technique converts branch instructions to calls to a branch function. The branch function then performs an integrity check of the program and calculates the proper branch target instruction. FIG. 14 illustrates what the factorial program could look like after the branch-based tamper resistance program has been applied.

Figure 15:
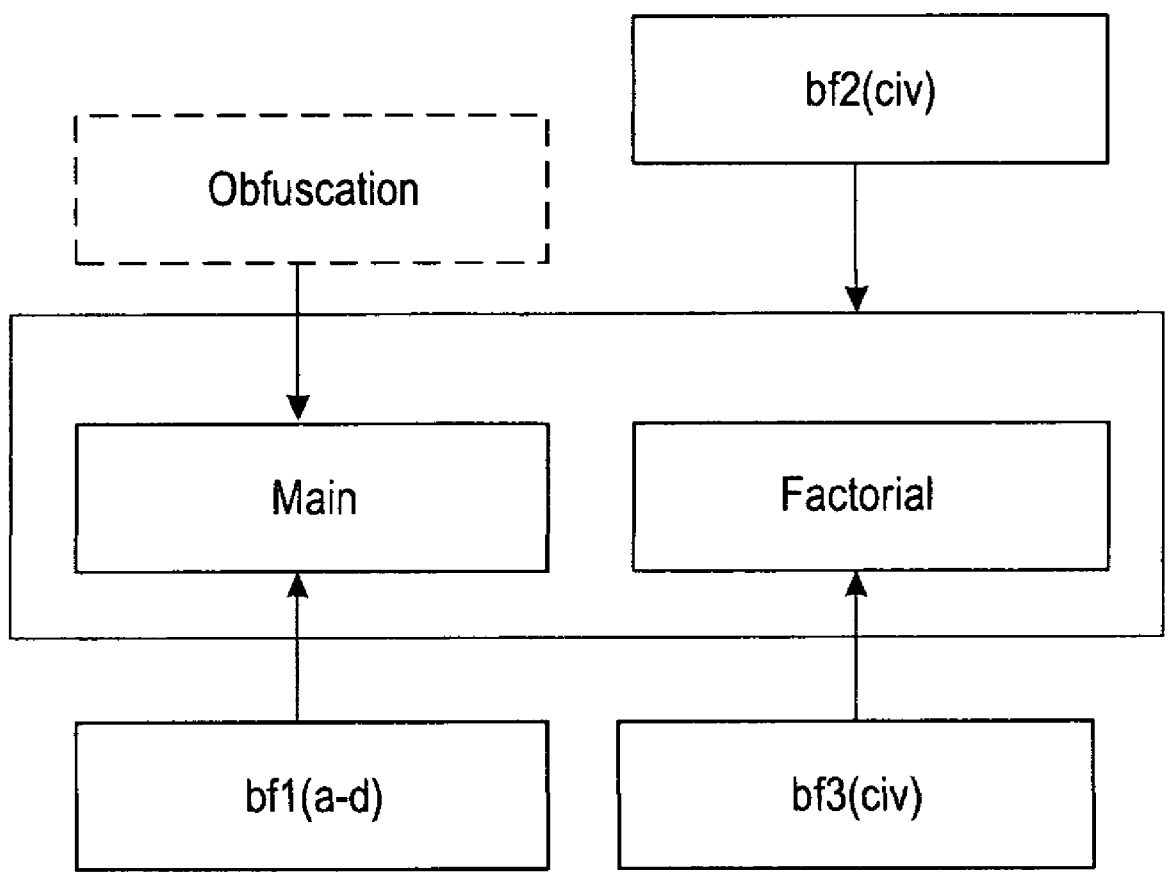
FIG. 15 is a function-instance graph.

In order to calculate the complexity rating for this example we first construct the graphical model, as shown in FIG. 15. This allows us to examine the topological configuration of the protection mechanisms. From the graphical model we can see that we have a redundancy configuration which includes both derived and unique protection mechanisms. Because the three branch functions operate in the same manner they are all considered similar, while the obfuscation is considered unique. This leads to the following total CR:

total $CR =$ $$CR(obf) + \max\{CR(BF_i)|1 \le i \le 3\} + \sum_{(j=1)\setminus i}^{3} CR(BF_j)[1 - sim(BF_i BF_j)]$$

Auxiliary Protection Rating

As mentioned above, the auxiliary protection rating indicates the degree to which additional measures have been taken to complicate an understanding of the program and/or its protection mechanisms. In this embodiment, questions relevant to this rating include:

Are common or well-known code sequences avoided? Many protection systems will leverage off the shelf cryptographic implementations. Strong attackers will be able to easily recognize the common code sequences without much analysis, thus reducing the effort required to attack the TRS system.

$$\begin{cases} 0, & \text{if } |\text{known code sequence} \in P_{TRS}| > \delta \\ 1, & \text{otherwise} \end{cases}$$

Are revealing names, strings, constants, etc. avoided? Constant values in a program decrease the amount of analysis required by an attacker by providing insight regarding functionality.

$$\begin{cases} 0, & \text{if } |\text{revealing value} \in P_{TRS}| > \delta \\ 1, & \text{otherwise} \end{cases}$$

Has all debug information been removed? Debug information is generally used to help a programmer understand what the software is doing, therefore it can do the same for an attacker.

$$\begin{cases} 0, & \text{if debug info} \in P_{TRS} \\ 1, & \text{otherwise} \end{cases}$$

Is long-lived, confidential data obfuscated? Confidential data should never be in the clear. Data obfuscation techniques, unlike obfuscation, can prevent an attacker from having access to the unprotected data.

$$\begin{cases} 0, & \text{if confidential data in the clear} \in P_{TRS} \\ 1, & \text{otherwise} \end{cases}$$

Are confidential values difficult to find because the values are erased from memory and the stack as soon as their use is no longer needed? Any confidential value which is in the clear should have as limited exposure as possible.

$$\begin{cases} 1, & \text{if } \dfrac{\sum_{i=1}^{n} |inst \text{ between val dead and erase}|}{n} > \delta \\ 0, & \text{otherwise} \end{cases}$$

Are highly confidential values never passed across DLL boundaries? It is impossible to ensure the integrity of a dynamically linked library and therefore a TRS system should prevent information leakage through these boundaries.

$$\frac{|\text{confidential values passed across }DLL|}{|\text{confidential boundaries}|}$$

Are sensitive or suggestive system calls done dynamically instead of statically? Dynamic system calls require more sophisticated analysis on the part of the attacker.

$$\frac{|\text{dynamic sensitive calls}|}{|\text{sensitive calls}|}$$

Does the system include misleading or Red Herring code? The mere presence of protection mechanisms often alerts attackers to the location of sensitive code, thus decreasing the amount of analysis required. By including code that looks important, an attacker wastes time analyzing unnecessary portions of the program.

$$\begin{cases} 1, & \text{if } \frac{|\text{red herring code blocks}|}{|\text{real blocks}|} > \delta \\ 0, & \text{otherwise} \end{cases}$$

Is non-essential functionality/data protected? By protecting non-essential functionality and data an attacker again wastes time analyzing unnecessary potions of the program. Additionally, the attacker could be led astray by the assumption that such information is significant.

$$\begin{cases} 1, & \text{if } \frac{|\text{protected non-essential blocks}|}{|\text{non-essential blocks}|} > \delta \\ 0, & \text{otherwise} \end{cases}$$

Are the different types of debuggers detected? There are a variety of different types of debuggers commonly used by attackers and they often require different detection methods. A comprehensive TRS system should include detection mechanisms for all of the commonly used debuggers. There are known ways to detect the presence of these different debuggers.

$$\frac{|\text{known debuggers detected}|}{|\text{known debuggers}|}$$

Are code modification attacks detected? A strong TRS system should be able to detect both changes in the environment as well as minute changes to the code.

$$\frac{|\text{code integrity check}|}{|\text{all integrity checks}|}$$

Figure 16:
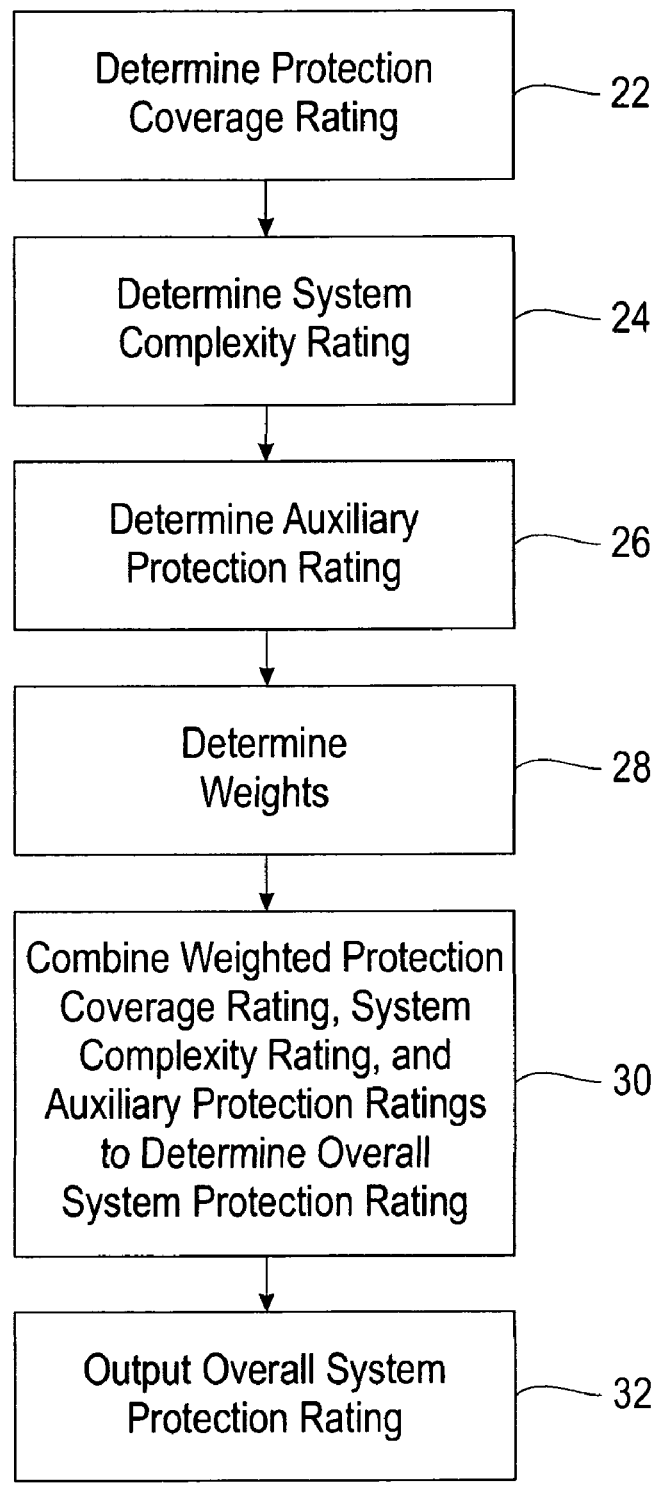
FIG. 16 is a method of rating a software system in accordance with an embodiment of the invention.

FIG. 16 is a flow chart of a process 20 for evaluating a tamper resistant software system in accordance with an embodiment of the invention. A protection coverage rating is first determined, step 22. This may be accomplished using the techniques described above. A system complexity rating is then determined, step 24, for example using the method described above. An auxiliary protection rating is then determined, step 26, which may be according to the above-described embodiment. Next, weights are determined, based on the relative importance of each rating, step 28. In step 30 the weighted protection coverage, system complexity, and auxiliary protection ratings are combined to determine an overall system protection rating. This combining step may be accomplished by addition or multiplication. For example, as discussed above in the case of an OSP evaluation, if the rating is considered to be the probability of subversion, then the combining step will use multiplication; if it is considered to be the cost of subversion, the combining step may use addition. The overall system protection rating may then be outputted, step 32.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 17:
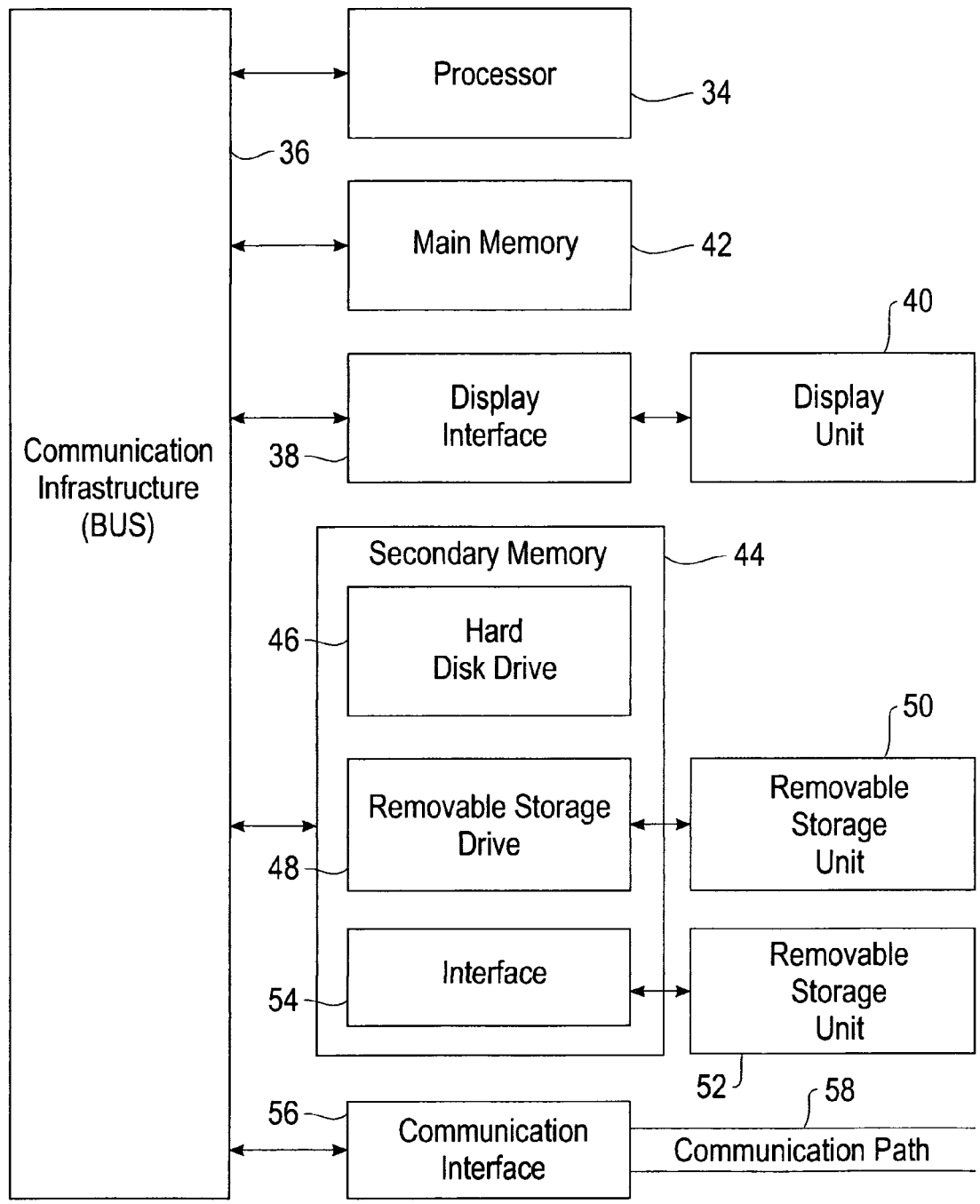
FIG. 17 shows a high level block diagram of an information processing system useful for implementing one embodiment of the present invention.

FIG. 17 is a high level block diagram showing an information processing system useful for implementing one embodiment of the present invention. The computer system includes one or more processors, such as processor 34. The processor 34 is connected to a communication infrastructure 36 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 38 that forwards graphics, text, and other data from the communication infrastructure 36 (or from a frame buffer not shown) for display on a display unit 40. The computer system also includes a main memory 42, preferably random access memory (RAM), and may also include a secondary memory 44. The secondary memory 44 may include, for example, a hard disk drive 46 and/or a removable storage drive 48, representing, for example, a floppy disk drive, a magnetic tape drive, or an optical disk drive. The removable storage drive 48 reads from and/or writes to a removable storage unit 50 in a manner well known to those having ordinary skill in the art. Removable storage unit 50 represents, for example, a floppy disk, a compact disc, a magnetic tape, or an optical disk, etc. which is read by and written to by removable storage drive 48. As will be appreciated, the removable storage unit 50 includes a computer readable medium having stored therein computer software and/or data.

In alternative embodiments, the secondary memory 44 may include other similar means for allowing computer programs or other instructions to be loaded into the computer system. Such means may include, for example, a removable storage unit 52 and an interface 54. Examples of such means may include a program cartridge and cartridge interface (such as that found in video game devices), a removable memory chip (such as an EPROM, or PROM) and associated socket, and other removable storage units 52 and interfaces 54 which allow software and data to be transferred from the removable storage unit 52 to the computer system.

The computer system may also include a communications interface 56. Communications interface 56 allows software and data to be transferred between the computer system and external devices. Examples of communications interface 96 may include a modem, a network interface (such as an Ethernet card), a communications port, or a PCMCIA slot and card, etc. Software and data transferred via communications interface 56 are in the form of signals which may be, for example, electronic, electromagnetic, optical, or other signals capable of being received by communications interface 56. These signals are provided to communications interface 56 via a communications path (i.e., channel) 58. This channel 58 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 42 and secondary memory 44, removable storage drive 48, and a hard disk installed in hard disk drive 46.

Computer programs (also called computer control logic) are stored in main memory 42 and/or secondary memory 44. Computer programs may also be received via communications interface 56. Such computer programs, when executed, enable the computer system to perform the features of the present invention as discussed herein. In particular, the computer programs, when executed, enable the processor 34 to perform the features of the computer system. Accordingly, such computer programs represent controllers of the computer system.

From the above description, it can be seen that the present invention provides a system, computer program product, and method for evaluating tamper resistant software systems. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   generating a model of tamper resistance capabilities, the generating comprising:
      creating a node in the model for each of a plurality of block of code;
      adding directed edges between nodes for each:
         node providing integrity verification for another node;
         node providing anti-debugging protection to another node; and
         node that repairs another node;
      adding additionally nodes for each block that contains concealment protection; and
      adding a superblock for nodes that provide protection for more than one additional node, the superblock encompassing all of the more than one additional nodes;
   defining, by a computer, a rating of the tamper resistance of a software system using data from the model;
   breaking down said rating into a plurality of metrics relevant to the tamper resistance of said software system;
   calculating, by the computer, a score for each of said metrics; and
   combining said scores of said metrics into a composite score for said rating.

2. The method according to claim 1 further comprising:
   defining a plurality of sub-ratings of the tamper resistance of said software system;
   performing said breaking down and calculating for said plurality of sub-ratings; and
   combining a plurality of said composite scores for said plurality of sub-ratings into an overall score for said software system.

3. The method according to claim 2 wherein said combining comprises:
   determining a weighted score for each said sub-rating, said weighting based on the relative importance of said sub-rating; and
   adding up said weighted scores for each said sub-rating.

4. The method according to claim 2 wherein said combining comprises:
   determining a weighted score for each said sub-rating, said weighting based on the relative importance of said sub-rating; and
   multiplying said weighted scores for each said sub-rating.

5. The method according to claim 1 wherein said rating is a rating of how much of said software system is covered by a protection mechanism.

6. The method according to claim 1 wherein said rating is a rating of the complexity of said software system.

7. The method according to claim 1 wherein said rating is a rating of auxiliary protection incorporated into said software system.

8. The method according to claim 1 wherein said combining comprises:
   determining a weighted score for each said metric, said weighting based on the relative importance of said metric; and
   combining said weighted scores for each metric.

9. The method according to claim 1 wherein the model is a graphical model.

10. The method according to claim 1 wherein said constructing comprises constructing a graphical representation of the relationship between functions of said software system.

11. A method comprising:
    generating a model of tamper resistance capabilities, the generating comprising:
       creating a node in the model for each of a plurality of block of code;
       adding directed edges between nodes for each:
          node providing integrity verification for another node;
          node providing anti-debugging protection to another node; and
          node that repairs another node;
       adding additionally nodes for each block that contains concealment protection; and
       adding a superblock for nodes that provide protection for more than one additional node, the superblock encompassing all of the more than one additional nodes;
    defining, by a computer, a rating and a plurality of sub-ratings of the tamper resistance of a software system, using data from the model;
    breaking down said plurality of sub-ratings into a plurality of metrics relevant to the tamper resistance of said software system;
    calculating, by the computer, a score for each metric;
    combining, by the computer, said scores of said metrics into composite scores for said sub-ratings; and
    combining, by the computer, said composite scores for said sub-ratings into an overall score for said rating.

12. The method according to claim 11 wherein said model comprises a graphical model.

13. The method according to claim 11 wherein said constructing comprises constructing a graphical representation of the relationship between functions of said software system.

14. The method according to claim 11 wherein said combining comprises:

determining a weighted score for each said metric, said weighting based on the relative importance of said metric; and combining said weighted scores for each metric.

15. A method comprising:
generating a model of tamper resistance capabilities, the generating comprising:
creating a node in the model for each of a plurality of block of code;
adding directed edges between nodes for each:
node providing integrity verification for another node;
node providing anti-debugging protection to another node; and
node that repairs another node;
adding additionally nodes for each block that contains concealment protection; and
adding a superblock for nodes that provide protection for more than one additional node, the superblock encompassing all of the more than one additional nodes;
defining, by a computer, a rating of the tamper resistance of at least two software systems using data from the model;
decomposing said rating into at least one sub-rating that is a subset of said rating;
breaking down said sub-rating into a plurality of metrics relevant to the tamper resistance of said at least two software systems;
calculating, by the computer, a score for each metric;
combining, by the computer, said scores of said metrics into a composite score for said sub-rating and combining said scores of said sub-ratings into a composite score for the said rating for each of said at least two software systems; and
comparing, by the computer, said ratings of different ones of said at least two software systems to determine which software system has the highest tamper resistance.

16. The method according to claim 15 wherein said sub-rating is a rating of how much of said software system is covered by a protection mechanism.

17. The method according to claim 15 wherein said sub-rating is a rating of the complexity of said software system.

18. The method according to claim 15 wherein said sub-rating is a rating of auxiliary protection incorporated into said software system.

19. A method of providing a rating of a software system comprising:
receiving, by a computer, a software system from an entity;
generating a model of tamper resistance capabilities, responsive to the receiving, the generating comprising:
creating a node in the model for each of a plurality of block of code;
adding directed edges between nodes for each:
node providing integrity verification for another node;
node providing anti-debugging protection to another node; and
node that repairs another node;
adding additionally nodes for each block that contains concealment protection; and
adding a superblock for nodes that provide protection for more than one additional node, the superblock encompassing all of the more than one additional nodes;
defining a rating of the tamper resistance of said software system using data from the model;
decomposing said rating into at least one sub-rating that is a subset of said rating;
breaking down said sub-rating into a plurality of metrics relevant to the tamper resistance of said software system;
calculating, by the computer, a score for each metric using data from the model;
combining, by the computer, said scores of said metrics into a composite score for said sub-rating and combining said scores of said sub-ratings into a composite score for said rating; and
providing a security rating for said software system to said entity.

20. The method according to claim 19 wherein said combining comprises:
determining a weighted score for each said metric, said weighting based on the relative importance of said metric; and
combining said weighted scores for each metric.

21. The method according to claim 19 wherein said model is a graphical model.

22. The method according to claim 19 wherein said constructing comprises constructing a graphical representation of the relationship between functions of said software system.

23. A computer program product for rating the tamper resistance of a software system, the computer program product comprising:
a non-transitory computer readable storage medium having computer usable program code embodied therewith, the computer usable program code comprising:
computer usable program code configured to:
generate a model of tamper resistance capabilities, the generating comprising:
creating a node in the model for each of a plurality of block of code;
adding directed edges between nodes for each:
node providing integrity verification for another node;
node providing anti-debugging protection to another node; and
node that repairs another node;
adding additionally nodes for each block that contains concealment protection; and
adding a superblock for nodes that provide protection for more than one additional node, the superblock encompassing all of the more than one additional nodes;
define a rating of the tamper resistance of a software system using data from the model;
decompose said rating into at least one sub-rating that is a subset of said rating;
break down said sub-rating into a plurality of metrics relevant to the tamper resistance of said software system;
calculate a score for each metric using data from the model; and
combine said scores of said metrics into a composite score for said rating.

24. The computer program product according to claim 23 wherein said model is a graphical model.

25. The method according to claim 23 wherein said constructing comprises constructing a graphical representation of the relationship between functions of said software system.

* * * * *